United States Patent
Lloyd et al.

(10) Patent No.: US 10,481,915 B2
(45) Date of Patent: Nov. 19, 2019

(54) SPLIT STORE DATA QUEUE DESIGN FOR AN OUT-OF-ORDER PROCESSOR

(71) Applicant: International Business Machines Corporation, Armonk, NY (US)

(72) Inventors: Bryan J. Lloyd, Austin, TX (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 15/709,740

(22) Filed: Sep. 20, 2017

(65) Prior Publication Data

US 2019/0087194 A1    Mar. 21, 2019

(51) Int. Cl.
| | |
|---|---|
| G06F 9/38 | (2018.01) |
| G06F 12/0846 | (2016.01) |
| G06F 12/0875 | (2016.01) |
| G06F 9/30 | (2018.01) |

(52) U.S. Cl.
CPC ........ G06F 9/3855 (2013.01); G06F 9/30036 (2013.01); G06F 9/30043 (2013.01); G06F 9/3851 (2013.01); G06F 12/0848 (2013.01); G06F 12/0875 (2013.01); G06F 2212/282 (2013.01); G06F 2212/452 (2013.01)

(58) Field of Classification Search
None
See application file for complete search history.

(56) References Cited

U.S. PATENT DOCUMENTS

| | | |
|---|---|---|
| 6,192,465 B1 | 2/2001 | Roberts |
| 6,609,191 B1 | 8/2003 | Hooker et al. |
| 6,981,128 B2 | 12/2005 | Fluhr et al. |
| 7,051,329 B1 * | 5/2006 | Boggs ................. G06F 9/30123 712/E9.027 |
| 7,890,674 B2 | 2/2011 | Spencer |
| 8,032,734 B2 | 10/2011 | Svendsen et al. |
| 8,041,928 B2 | 10/2011 | Burky et al. |

(Continued)

OTHER PUBLICATIONS

H. M. Mathis, et al., "Characterization of simultaneous multithreading (SMT) Efficiency in POWER5", IBM J. Res. & Dev. vol. 49 No. 4/5 Jul.-Sep. 2005, p. 1-10.

(Continued)

*Primary Examiner* — Eric Coleman
(74) *Attorney, Agent, or Firm* — Cantor Colburn LLP; Jason Sosa

(57) ABSTRACT

Provided are methods, systems, and computer program products to implementing a split store data queue for an out-of-order (OoO) processor. A non-limiting example of the computer-implemented method includes detecting, by the OoO processor, a mode of the OoO processor. The method further includes partitioning, by the OoO processor, a first store data queue (SDQ) and a second SDQ based at least in part on the mode of the OoO processor. The method further includes receiving, by the OoO processor, a vector operand. The method further includes storing, by the OoO processor, the vector operand in at least one of the first SDQ and the second SDQ based at least in part on the mode of the OoO processor.

17 Claims, 5 Drawing Sheets

(56) References Cited

U.S. PATENT DOCUMENTS

| | | | |
|---|---|---|---|
| 8,135,885 B1* | 3/2012 | Wong | G06F 5/00 710/15 |
| 8,335,911 B2* | 12/2012 | Golla | G06F 9/3851 712/220 |
| 9,146,744 B2 | 9/2015 | Caprioli et al. | |
| 2003/0033509 A1* | 2/2003 | Leibholz | G06F 9/3012 712/228 |
| 2003/0126416 A1* | 7/2003 | Marr | G06F 9/3009 712/235 |
| 2004/0216101 A1* | 10/2004 | Burky | G06F 9/485 718/100 |
| 2005/0204103 A1 | 9/2005 | Dennison | |
| 2006/0265576 A1* | 11/2006 | Davis | G06F 9/3017 712/229 |
| 2008/0123671 A1* | 5/2008 | Spencer | H04L 47/10 370/412 |
| 2011/0296423 A1* | 12/2011 | Elnozahy | G06F 9/54 718/102 |
| 2012/0155273 A1 | 6/2012 | Hughes et al. | |
| 2012/0216012 A1* | 8/2012 | Vorbach | G06F 8/443 712/11 |
| 2015/0095618 A1 | 4/2015 | Abdallah | |
| 2015/0100965 A1* | 4/2015 | Tran | G06F 9/5011 718/103 |
| 2015/0134934 A1 | 5/2015 | Abdallah | |
| 2016/0202988 A1 | 7/2016 | Ayub et al. | |

OTHER PUBLICATIONS

White Paper, "The IBM Power8 Processor Core Microarchitecture", IBM Developer, Feb. 18, 2016, p. 1-126.

Y. Katz, et al., "A Novel Approach for Implementing Microarchitectural Verification Plans in Processor Designs", Springer-Verlag Berlin Heidelberg, 2013, p. 1-15.

* cited by examiner

SPLIT STORE DATA QUEUE DESIGN FOR AN OUT-OF-ORDER PROCESSOR

BACKGROUND

Embodiments of the present invention related in general to instruction sequencing in an out-of-order (OoO) processor, and more specifically to implementing a split store data queue for an OoO processor.

In an out-of-order (OoO) processor, an instruction sequencing unit (ISU) dispatches instructions to various issue queues, renames registers in support of OoO execution, issues instructions from the various issue queues to the execution pipelines, completes execution instructions, and handles exception conditions. Register renaming is typically performed by mapper logic in the ISU before the instructions are placed in their respective issue queues.

SUMMARY

Embodiments of the present invention include methods, systems, and computer program products for implementing a split store data queue for an out-of-order processor. A non-limiting example of the computer-implemented method includes detecting, by the OoO processor, a mode of the OoO processor. The method further includes partitioning, by the OoO processor, a first store data queue (SDQ) and a second SDQ based at least in part on the mode of the OoO processor. The method further includes receiving, by the OoO processor, a vector operand. The method further includes storing, by the OoO processor, the vector operand in at least one of the first SDQ and the second SDQ based at least in part on the mode of the OoO processor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
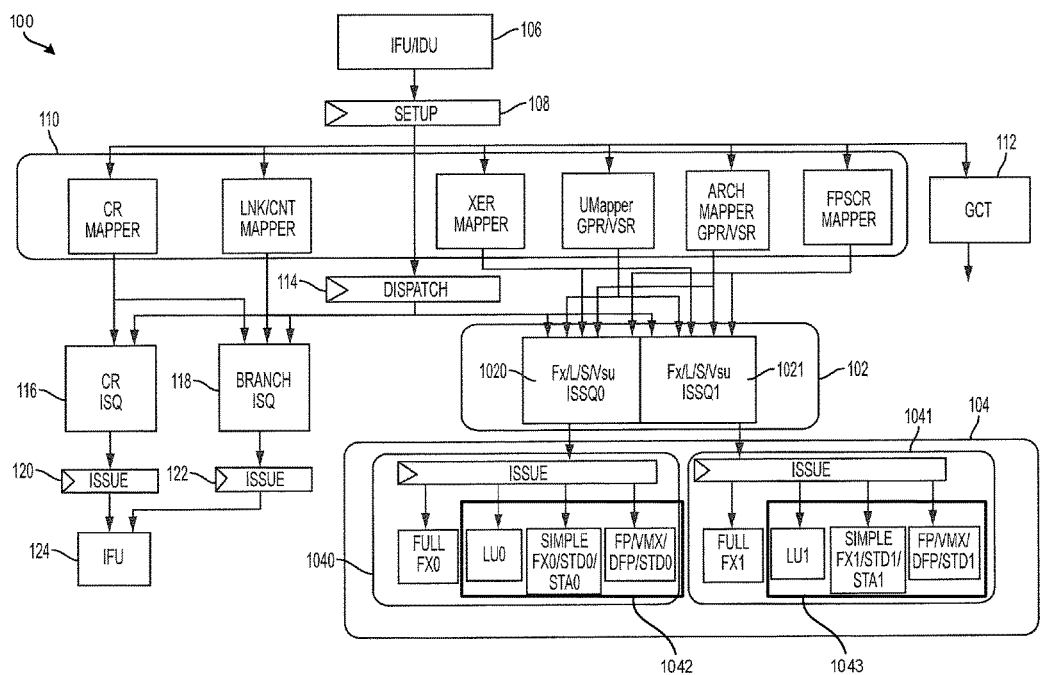
FIG. 1 depicts a block diagram of a processing system that includes an instruction sequencing unit (ISU) of an out-of-order (OoO) processor for implementing a split store data queue according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Out-of-order (OoO) processors execute instructions in an order based on the availability of input data instead of by the instructions' original order in a program. This enables OoO processors to avoid being idle while waiting for a preceding instruction to complete before retrieving data for a next instruction in a program and to process the next instructions that are able to run immediately and independently. Accordingly, OoO processors reduce wasted cycles because instruction cycles that would otherwise be wasted by delay can be utilized.

Some OoO processors utilize different modes or operating states for processing instructions. For example, an OoO processor can operate in a single thread mode to execute instructions in a single thread (ST) and can operate in a multithread (MT) mode to execute instructions in multiple threads. MT mode can include different types of simultaneous multithreading (SMT) modes (e.g., symmetric multiprocessing 2 SMP2), symmetric multiprocessing 4 (SMP4), etc.), which are described in more detail herein.

One or more exemplary embodiments of the present invention provide for a split store data queue (SDQ) design to support efficient 8 byte (8 B) and 16 byte (16 B) stores, such as for wide vectors (e.g., 16 bytes) in different modes. In ST mode, both SDQs hold 40 entries. However, because the SDQs store the same information, the queues are effectively 40 entries, not 80 entries. Each SDQ includes two store write/issue ports (one for each store—ST0 & ST1).

In SMT2 mode, the SDQs do not store the same information and therefore the SDQs are effectively 80 entries, 40 for SDQ0 and 40 for SDQ1. In this case, only one store write port (ST) is needed. In SMT4 mode, the SDQs are partitioned to handle 80 entries. For example, SDQ0 is partitioned into two 20 entry circular queues, and SDQ1 is also partitioned into two 20 entry circular queues. Accordingly, each of four threads is allocated a 20 entry queue (half of an SDQ).

The most that can be stored in one cycle is 16 bytes but normally only 8 bytes are stored in a cycle. In MT modes (e.g., SMT2 mode, SMT4 mode), most of the time, operands are 8 bytes, but occasionally vector operands use more than 8 bytes (e.g., 8 bytes+8 bytes (16 bytes)).

In MT modes, vector operations can be stored using two consecutive entries in the SDQ. In this way, the entries are 16 byte aligned. In ST mode, vector operation can be stored 8 B in the SDQ0 and the other 8 B in SDQ1. Accordingly, only a single store forwarding occurs per cycle. With this approach, the LD0 store forward and the LD1 store forward width becomes (0:63) instead of (0:127). In this implementation only a single vector operation is forwarded per cycle, instead of two vector operations forwarded per cycle.

Turning now to FIG. 1, a block diagram of a processing system 100 that includes an instruction sequencing unit (ISU) of an out-of-order (OoO) processor wide vector execution in a single thread mode is generally shown according to one or more embodiments of the invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 is shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper GPR/VSR, ARCH Mapper GPR/VSR, and FPSCR mapper are input to issue queue 102. As shown in FIG. 1, issue queue 102 tracks issued floating point instructions (Fx), load instructions (L), store instructions (S), and vector-and-scalar unit (VSU) instructions. As shown in the embodiment of FIG. 1, issue queue 102 is broken up into two parts, ISQ0 1020 and ISQ1 1021, each portion holding forty-eight instructions.

When the processor is executing in ST mode, the issue queue 102 can be used as a single logical issue queue that contains both ISQ0 1020 and ISQ1 1021 to process all of the instructions (in this example all ninety-six instructions) of a single thread. When the processor is executing in MT mode, ISQ0 1020 can be used to process forty-eight instructions from a first thread and ISQ1 1021 is used to process forty-eight instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FPNMX/DFP/STD0 form a load-store unit (LSU) 1042. Similarly, the LU1, the Simple FX1/STD1/STA1, and the FP/VMX/DFP/STD1 form a load-store unit (LSU) 1043.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
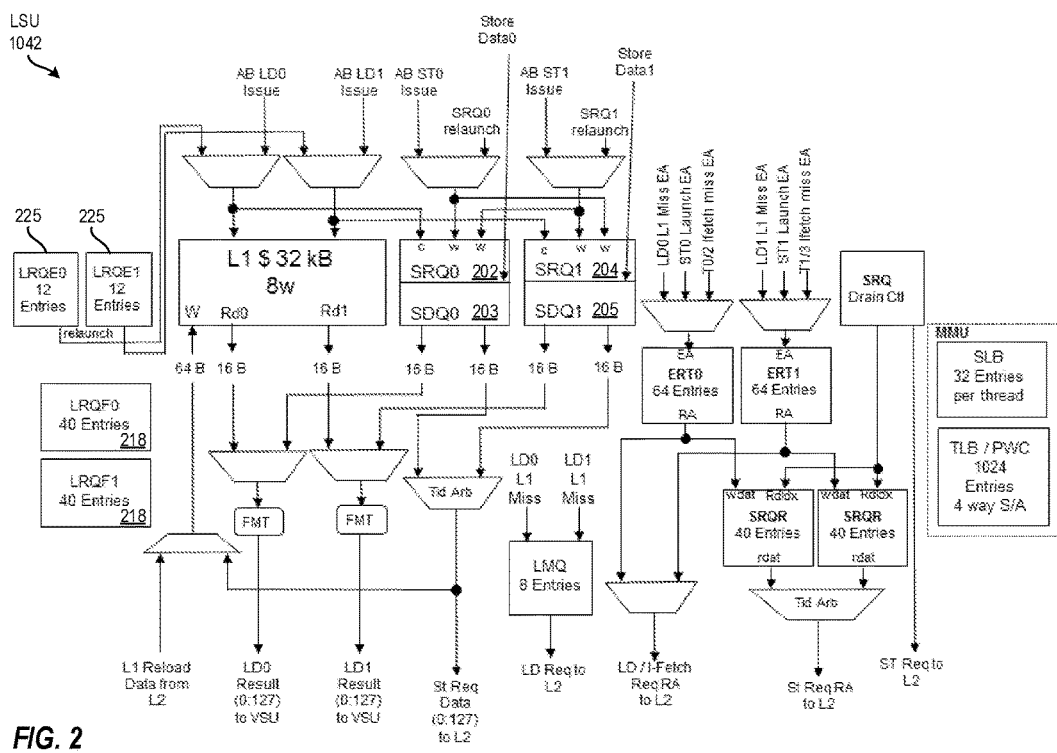
FIG. 2 depicts a block diagram of a load-store unit (LSU) that implements a split store data queue for an OoO processor according to one or more embodiments of the present invention.

FIG. 2 depicts a block diagram of a load-store unit (LSU) 1042 that implements a split store data queue for an OoO processor according to one or more embodiments of the present invention. The LSU 1042 depicted facilitates execution in a 2 load 2 store mode; however, it should be noted that the embodiments described herein are not limited to such an LSU.

The LSU 1042 includes a load-reorder-queue (LRQF) 218, where all load operations are tracked from dispatch to complete. The LSU 1042 further includes a second load-reorder-queue LRQE 225. When a load is rejected (for a cache miss, or translation miss, or previous instruction it depends on getting rejected) the load is taken out of the issue queue and placed in an LRQE entry for it to be re-issued from there. The depicted LRQE 225 is partitioned into 2 instances, LRQE0, and LRQE1 for the two load mode, with 12 entries each (24 entries total). The LRQF 218 facilitates tracking all load operations from issue to completion. Two store reorder queues (SRQ) 202, 204 are included in the LSU 1042 and have a similar structure as the LRQF 218, with two instances SRQ0 (i.e., SRQ 202) and SRQ1 (i.e., SRQ 204) of 40 entries (each instance), which are circular in order entry allocation, circular in order entry drain, and circular in order entry deallocation. Further, the SRQ 202, 204 are partitioned similar to the LRQ 218, for example T0, T2 ops launched on pipes LD0, ST0; T1, T3 ops launched on pipes LD1, ST1; and no pipe/thread partition in ST mode.

The LSU 1042 depicted in FIG. 2 also includes Store Data Queues (SDQ) 203, 205, which in some embodiments can be integrated as part of the SRQ 202, 204 itself to further save chip area. In case of wider operands, such as vector operands, for example, are 16 bytes wide, the SRQ stores the operands using two consecutive entries in the SRQ 202, 204 in MT mode. In ST mode, the wider operands are stored in the SRQ0 and SRQ1, for example, 8 bytes each.

For example, many operands can be 8 bytes or less. These are stored in one entry in the SDQ (e.g., the SDQ0 203, the SDQ1 204). For example, in ST mode, the operands are stored in an entry of the SDQ 203, 205. In such cases, the SDQ0 203 and the SDQ 1 205 include the same entries. However, vector operands are larger (e.g., 16 bytes) and are handled differently depending on the mode of the OoO processor. For example, in MT modes, vector operands can be stored using two consecutive entries in the SDQ e.g., the SDQ0 203, the SDQ1 204). In ST mode, however, vector operands can be stored in 8 bytes in the SDQ0 203 and 8 bytes in the SDQ0 204. This limits no more than one store forwarding per cycle, which provides adequate performance. With this approach, the LD0 st Fwd and the LD2 st Fws width becomes (0:63) (shown in FIG. 3).

Figure 3:
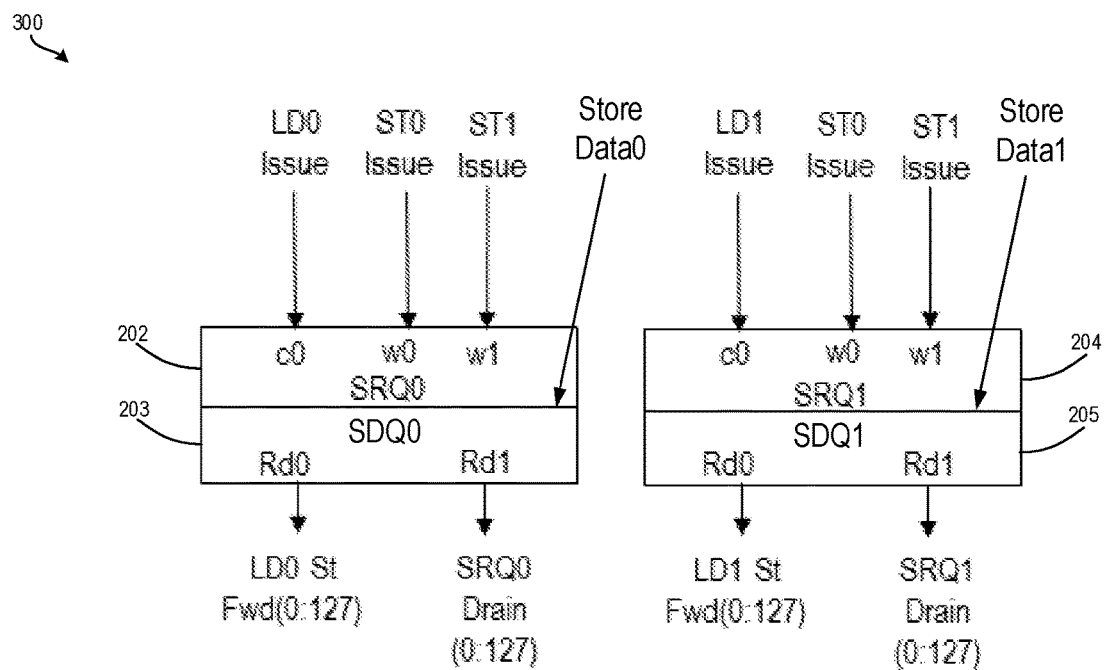
FIG. 3 depicts a store reorder queue implementing a split store data queue design for an OoO according to one or more embodiments of the present invention.

In particular, FIG. 3 depicts a store reorder queue (SRQ) implementing a split store data queue (SDQ) design for an OoO according to one or more embodiments of the present invention. In MT mode, vector operations can be stored using two consecutive entries in the SDQ0 203 and the SDQ1 205. In this way, the entries are 16 byte aligned. In ST mode, vector operation can be stored 8B in the SDQ0 and the other 8 B in SDQ1. Accordingly, only a single store forwarding occurs per cycle. With this approach, the LD0 store forward and the LD1 store forward width becomes (0:63) instead of (0:127). In this implementation only a single vector operation is forwarded per cycle, instead of two vector operations forwarded per cycle.

Depending on the mode (e.g., ST mode, SMT2 mode, SMT4 mode) the SRQ0 202 and SRQ1 204 can be partitioned differently. For example, in the ST mode, both copies (e.g., SDQ0 203 and SDQ1 205) have identical values, with the copies being different in the MT modes. In the case of ST mode, SRQ1 is an SRQ0 copy. In ST mode, thread/entry partitioning is as follows:

ST:SRQ0[0:39] circular queue

In SMT2 mode, each thread is allocated 40 entries (0:39) in each of the SRQs. Thread/entry partitioning is as follows for SMT2 mode:

SMT2:T0: SRQ0[0:39] circular queue
SMT2:T1: SRQ0[0:39] circular queue

In SMT4 mode, both instances can be further partitioned, with each thread allocated 20 entries ([0:19], [20:39]) from the SRQs 202, 204. In an example embodiment, thread/entry partitioning is as follows for SMT4 mode:

SMT4:T0: SRQ0[0:19] circular queue
SMT4:T1: SRQ0[0:19] circular queue
SMT4:T2: SRQ0[20:39] circular queue
SMT4:T3: SRQ0[20:39] circular queue In one or more examples in the SMT4 mode, store drain arbitration occurs by using intra-SRQ read pointer multiplexing. Alternatively, or in addition, an inter SRQ0/1 multiplexing is performed in SMT2, and SMT4 modes. In accordance with one or more embodiments of the present invention, in the ST mode drain is performed only on SRQ0.

The SRQ 202, 204 queue operations of different types (e.g., stores, barriers, DCB, ICBI or TLB type of operations). In accordance with one or more embodiments of the present invention, a single s-tag is used for both store_agen and store_data. The SRQ 202, 204 handles load-hit-store (LHS) cases (same thread only). For example, all loads issued are checked by the SRQ 202, 204 to ensure there are no older stores with a data conflict. The data conflict can be detected by comparing loads EA and data byte flags against older stores in the SRQ EA array.

SRQ entries are allocated at dispatch where the dispatched instruction tags (itags) are filled into the correct row. Further, SRQ entries are deallocated on store drain. In one or more examples, the itag arrays hold "overflow" dispatches. For example, information is written into the itag array at dispatch if the row in the SRQ that is desired, say SRQ entry x is still in use. When, the SRQ entry x is deallocated, its corresponding row in the SRQ overflow itag structure is read out and copied into the main SRQ itag array structure (i.e., a read of the overflow itag structure is gated depending on whether there are any valid entries in the overflow itag array for a given thread/region). The main SRQ 0/1 itag array is cammed (or ½ cammed in SMT4) to determine which physical row to write into upon store issue, so that the ISU issues stores based on the itag. "Camming" refers to looking up corresponding addresses, such as an real address corresponding to an effective address (or vice versa) a content addressable memory (CAM). A cam implements lookup table functionality in a single clock cycle using dedicated comparison circuitry. The overall function of a CAM is to take a search word and return the matching memory location. The SRQ 202, 204 send, the itag to the ISU when a store drains & deallocates.

Figure 4:
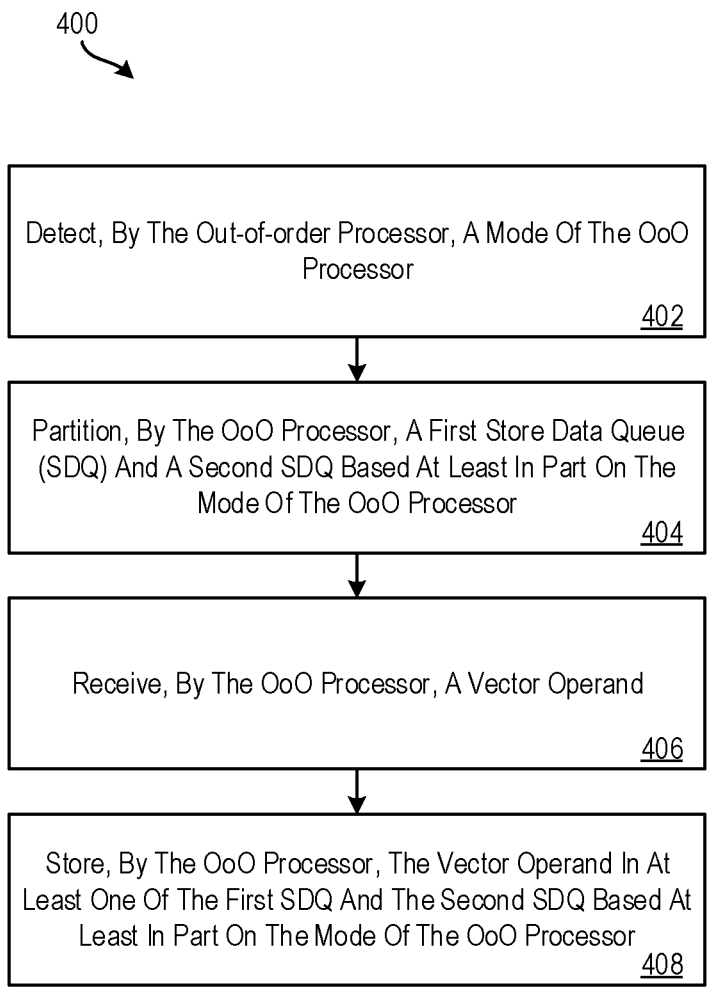
FIG. 4 depicts a flow diagram of a method for implementing a split store data queue for an OoO processor according to one or more embodiments of the invention.

FIG. 4 depicts a flow diagram of a method 400 for implementing a split store data queue for an out-of-order processor according to one or more embodiments of the present invention. The method 400 can be implemented by a suitable processing system, such as the processing system 100 of FIG. 1, the processing system 500 of FIG. 5, or another suitable processing system.

At block 402, the OoO processor detects a mode of the OoO processor. The mode can be a single thread mode or a multithread mode (e.g., SMT2, SMT4). At block 404, the OoO processor partitions a first SDQ (e.g., the SDQ0 203) and a second SDQ (e.g., the SDQ1 205) based on the mode of the OoO processor. At block 406, the OoO processor receives a vector operand and, at block 408, stores the vector operand in at least one of the first SDQ and the second SDQ based at least in part on the mode of the OoO processor.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
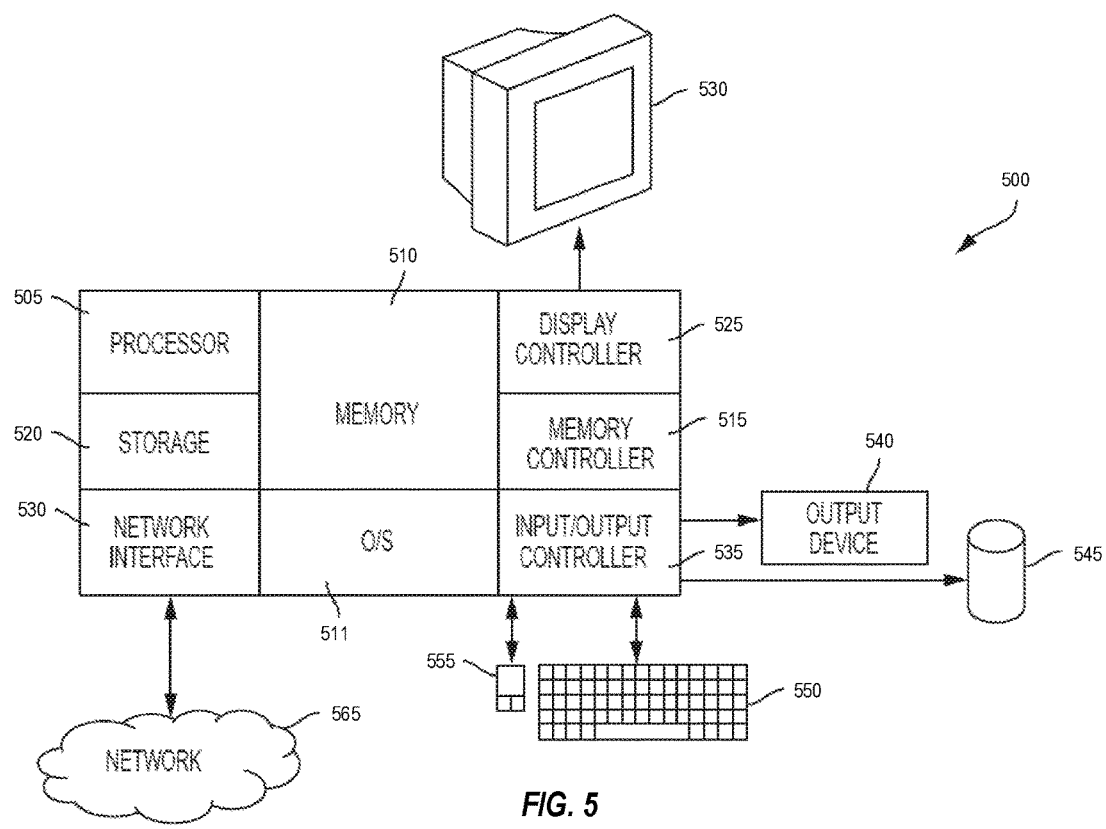
FIG. 5 depicts a processing system for implementing the techniques described herein according to one or more embodiments of the present invention.

Turning now to FIG. 5, a block diagram of a computer system 500 for implementing some or all aspects of one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a mobile device, personal computer, workstation, minicomputer, or mainframe computer.

In an exemplary embodiment, as shown in FIG. 5, the computer system 500 includes a processor 505, memory 512 coupled to a memory controller 515, and one or more input devices 545 and/or output devices 547, such as peripherals, that are communicatively coupled via a local I/O controller 535. These devices 547 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 547, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 512. The processor 505 may be a custom made or commercially available processor, a central processing unit (CPU), an auxiliary processor among several processors associated with the computer system 500, a semiconductor based microprocessor (in the form of a microchip or chip set), a microprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 512 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 512 may incorporate electronic, magnetic, optical, or other types of storage media. Note that the memory 512 may have a distributed architecture, where various components are situated remote from one another but may be accessed by the processor 505.

The instructions in memory 512 may include one or more separate programs, each of which comprises an ordered listing of executable instructions for implementing logical functions. In the example of FIG. 5, the instructions in the memory 512 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 527, which may be a storage device such as a hard disk drive or solid state drive. The stored instructions in memory 512 or in storage 527 may include those enabling the processor 505 to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing a partitioned load request queue and store request queue can be embodied, in whole or in part, in computer program products or in computer systems 500, such as that illustrated in FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for a split store data queue for an out-of-order (OoO) processor, the method comprising:
    detecting, by the OoO processor, a mode of the OoO processor;
    partitioning, by the OoO processor, a first store data queue (SDQ) and a second SDQ based at least in part on the mode of the OoO processor;
    receiving, by the OoO processor, a vector operand; and
    storing, by the OoO processor, the vector operand in at least one of the first SDQ and the second SDQ based at least in part on the mode of the OoO processor,
    wherein, responsive to the mode of the OoO processor being detected to be a single thread mode, the first SDQ is partitioned to store first entries and the second SDQ is partitioned to store copies of the first entries.

2. The computer-implemented method of claim 1, wherein the mode of the OoO processor is one of a single thread mode and a multithread mode.

3. The computer-implemented method of claim 2, wherein the multithread mode is a symmetric multiprocessing 2 (SMP2) mode.

4. The computer-implemented method of claim 3, wherein the first SDQ is partitioned to store first entries, wherein the second SDQ is partitioned to store second entries, and wherein the first entries differ from the second entries.

5. The computer-implemented method of claim 2, wherein the multithread mode is a symmetric multiprocessing 4 (SMP4) mode.

6. The computer-implemented method of claim 5, wherein the first SDQ is partitioned to store first entries, wherein a first portion of the first entries of the first SDQ are allocated to a first thread and wherein a second portion of the first entries of the first SDQ are allocated to a second thread.

7. The computer-implemented method of claim 6, wherein the second SDQ is partitioned to store second entries, wherein a first portion of the second entries of the second SDQ are allocated to a third thread and wherein a second portion of the second entries of the second SDQ are allocated to a fourth thread.

8. The computer-implemented method of claim 1, wherein the first SDQ is a circular queue, and wherein the second SDQ is a circular queue.

9. A system for wide vector execution for an out-of-order processor, the system comprising:
    a memory having computer readable instructions; and
    the out-of-order processor for executing the computer readable instructions, the computer readable instructions controlling the out-of-order processor to perform operations comprising:
    detecting, by the OoO processor, a mode of the OoO processor;
    partitioning, by the OoO processor, a first store data queue (SDQ) and a second SDQ based at least in part on the mode of the OoO processor;
    receiving, by the OoO processor, a vector operand; and
    storing, by the OoO processor, the vector operand in at least one of the first SDQ and the second SDQ based at least in part on the mode of the OoO processor,
    wherein, responsive to the mode of the OoO processor being detected to be a single thread mode, the first SDQ is partitioned to store first entries and the second SDQ is partitioned to store copies of the first entries.

10. The system of claim 9, wherein the mode of the OoO processor is one of a single thread mode and a multithread mode.

11. The system of claim 10, wherein the multithread mode is a symmetric multiprocessing 2 (SMP2) mode.

12. The system of claim 11, wherein the first SDQ is partitioned to store first entries, wherein the second SDQ is partitioned to store second entries, and wherein the first entries differ from the second entries.

13. The system of claim 10, wherein the multithread mode is a symmetric multiprocessing 4 (SMP4) mode.

14. The system of claim 13, wherein the first SDQ is partitioned to store first entries, wherein a first portion of the first entries of the first SDQ are allocated to a first thread and wherein a second portion of the first entries of the first SDQ are allocated to a second thread.

15. The system of claim 14, wherein the second SDQ is partitioned to store second entries, wherein a first portion of the second entries of the second SDQ are allocated to a third thread and wherein a second portion of the second entries of the second SDQ are allocated to a fourth thread.

16. The system of claim 9, wherein the first SDQ is a circular queue, and wherein the second SDQ is a circular queue.

17. A computer program product comprising a computer readable storage medium having program instructions embodied therewith, the program instructions executable by an out-of-order processor to cause the out-of-order processor to perform operations comprising:
    detecting, by the OoO processor, a mode of the OoO processor;
    partitioning, by the OoO processor, a first store data queue (SDQ) and a second SDQ based at least in part on the mode of the OoO processor;
    receiving, by the OoO processor, a vector operand; and
    storing, by the OoO processor, the vector operand in at least one of the first SDQ and the second SDQ based at least in part on the mode of the OoO processor,
    wherein, responsive to the mode of the OoO processor being detected to be a single thread mode, the first SDQ is partitioned to store first entries and the second SDQ is partitioned to store copies of the first entries.

* * * * *